United States Patent [19]

Graebner

[11] 4,164,343

[45] Aug. 14, 1979

[54] ECCENTRIC BALL TYPE VALVE

[75] Inventor: Heinz Graebner, Jeffersonville, Ind.

[73] Assignee: Henry Voyt Machine Co. Inc., Louisville, Ky.

[21] Appl. No.: 832,167

[22] Filed: Sep. 12, 1977

[51] Int. Cl.² ............................................. F16K 5/06
[52] U.S. Cl. ................................. 251/315; 137/315; 29/157.1 R
[58] Field of Search ............... 251/315, 160, 161, 192, 251/287, 298, 306; 137/315; 29/157.1 R

[56] References Cited

U.S. PATENT DOCUMENTS

| | | | |
|---|---|---|---|
| 2,577,725 | 12/1951 | Drake | 251/160 |
| 2,685,427 | 8/1954 | Bugg | 251/315 |
| 3,077,201 | 2/1963 | Dumm | 251/315 |
| 3,473,554 | 10/1969 | King | 251/315 |
| 3,780,985 | 12/1973 | Perry | 251/315 |
| 3,946,986 | 3/1976 | Sutter et al. | 251/298 |

FOREIGN PATENT DOCUMENTS

| | | | |
|---|---|---|---|
| 555371 | 4/1958 | Canada | 251/315 |
| 897239 | 5/1962 | United Kingdom | 251/315 |

Primary Examiner—William R. Cline
Assistant Examiner—H. Jay Spiegel
Attorney, Agent, or Firm—Price and Caslin

[57] ABSTRACT

A ball type valve for high pressure lines is designed so that the spherical valve member is offset from the centerline of the valve stem in such a manner that the spherical valve member in the open position has a cylindrical fluid passage in parallel alignment with the flow axis of the inlet and outlet passages, but in the closed position is transversely disposed across the valve chamber so that the cylindrical flow passage is perpendicular to the flow axis of the inlet and outlet passages. Due to the eccentric placement of the valve stem onto the spherical valve member, and the eccentric placement of the bore of the bonnet in which the valve stem rotates relative to the centerline of the bonnet, and the eccentric placement of the bonnet opening relative to the centerline of the inlet and outlet passages, the spherical valve member rotates in an arc from open position to closed position so as to approach the valve seat tangentially with a wiping motion and at an angle of approach so that the spherical valve member is self-locking. Further, the design of the valve is such that in open position, the surface of the spherical valve member engages the wall of the valve chamber to prevent further rotation. This eliminates the need for an external stop and prevents rotation of the spherical valve member beyond the full open position.

6 Claims, 13 Drawing Figures

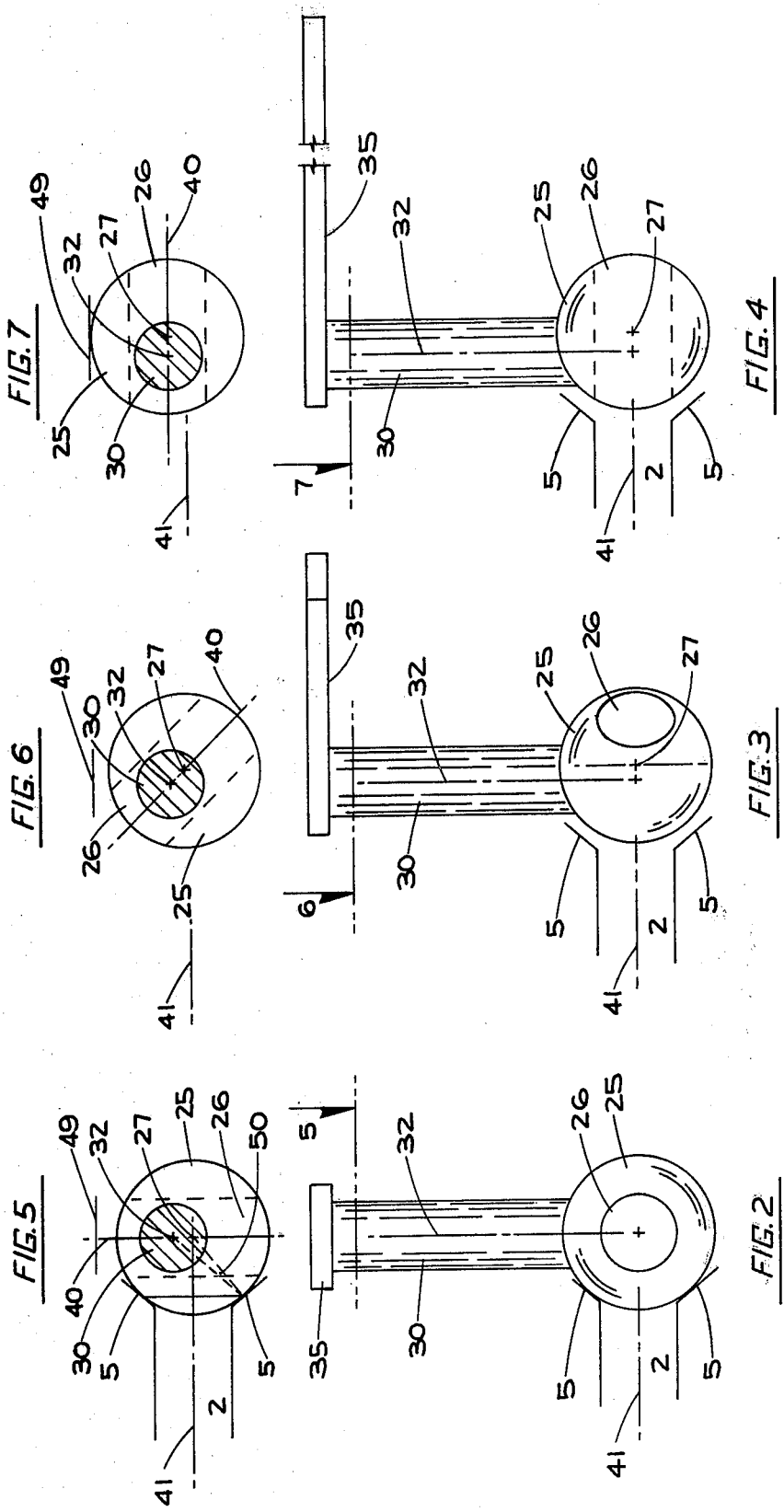

ECCENTRIC BALL TYPE VALVE

FIELD OF THE INVENTION

This invention relates to a high pressure valve structure. Further, this invention relates to a ball type valve suitable for use in high pressure and high temperature lines. Further, this invention relates to the provision of a ball type valve structure in which the centerline of the spherical valve member is offset relative to the centerline of the valve stem and in which the valve stem is eccentrically mounted in the bore of the bonnet and in which the bonnet is offset within the valve casing so that the compound action of the built-in eccentricities causes the spherical valve member to move: in an arc, from a full open position, in which the cylindrical fluid passage is in parallel alignment with the axial flow line of the valve; to a full closed position, in which the spherical valve member is in seating engagement with the valve seat and in which the fluid cylindrical passage is transversely disposed across the valve chamber normal to the axial flow line.

BACKGROUND OF THE INVENTION

Valves for use in high pressure lines must meet certain high standards. It is necessary in many petrochemical industry applications, for example, that the valves be "fire-safe" so that in the event of a fire in a processing plant, the valves will remain closed to stop the flow of any fluids which may be hazardous if exposed to open flames. This means that the valve must have metal-to-metal contact and must not use elastomeric or heat decomposable sealing surfaces. Eccentric ball type valves and valves utilizing segments of spheres have been proposed for high pressure lines. However, those having metal-to-metal seating engagement with essentially quarter-turn operating motion have not found wide acceptance due to the extremely fine manufacturing tolerances required for positive closure of such valves. Thus, for example, it is necessary, with an eccentric ball type valve, to provide that the spherical valve member engages the seat in only one angular position. Thus, as the valve is opened, the spherical valve member moves out of engagement with the seat and out of engagement with the wall of the valve chamber for ease in opening and closing. However, in order to do this and seat properly for complete closure, it is necessary that all of the valve components related to seating be machined to such fine tolerances that mass production, for the most part, has not been feasible.

BACKGROUND OF THE PRIOR ART

According to the proposals of which I am aware, all of the valve members have been pivoted on trunions fit in sockets, both at the bottom and top of the valve chamber. Further, the eccentric members have been situated in such a way that the compound action of the valve stem and spherical valve member rotation has produced, instead of an arc-like path, an axial path so that the spherical valve member moves directly into the seat. Accordingly, foreign matter is apt to be situated between the spherical valve member and the seat, thus preventing a tight closure. Various of these proposals have been shown in the prior art as, for example, in the patent to Drake, U.S. Pat. No. 2,577,725 and in the patent to Muench, U.S. Pat. No. 3,262,671. However, both of these patents involve essentially straight line axial movement of the spherical member against the seat rather than a tangential approach to the seat.

SUMMARY OF THE INVENTION

According to this invention, the spherical valve member is attached to the valve stem so that the centerline of the valve stem is offset relative to the spherical valve member. The valve stem is rotatably journaled in the bore of the valve bonnet so that the centerline of the bore of the bonnet is offset relative to the centerline of the bonnet. The bonnet is rotatably assembled in the bonnet opening which is offset in the valve casing relative to the centerline of the inlet and outlet passages. Further, the design of this valve involves the movement from:

1. an open position, in which the fluid cylindrical passage of the spherical valve member is in parallel alignment with the axis of the aligned inlet and outlet passages;
2. to a closed position, in which the cylindrical fluid passage is transversely disposed across the valve chamber, normal to the axial flow line.

The design is such that in the open position, the surface of the spherical valve member is engaged with the wall of the valve chamber, thus eliminating the need for an external back stop. The spherical valve member moves toward closed position in an arc so as to engage the valve seat tangentially with a wiping action. This prevents the lodgement therebetween of foreign matter which might prevent a tight closure. Further, the angle of approach of the spherical valve member to the seat in closed position is such that the closure is self-locking, remaining closed even in the presence of vibration often encountered in petrochemical pipe lines. This is accomplished within acceptable manufacturing tolerances by the method of assembly of the unit. The spherical valve member attached to the valve stem is placed in the valve chamber with the cylindrical fluid passageway disposed transversely across the casing perpendicular to the axial flow line and the bonnet is placed loosely within the bonnet opening in the valve casing so that the valve stem projects through the bore of the bonnet. Thereafter, the bonnet is turned so that the wall of the bonnet bore moves the valve stem and the spherical valve member effectively in a straight line into engagement with the seat. Then, the bonnet is welded permanently into position in the valve casing and no further adjustment is made. This assembly, in one embodiment, is made possible by making the bore of the bonnet slightly larger in diameter than the external diameter of the valve stem and providing packing between the valve stem and the internal diameter of the bore so that the valve stem is allowed to move axially relative to the centerline of the valve seat, responsive to the rotary action of the eccentrically-disposed bore. It is within the scope of this invention, however, to utilize other known means of moving the spherical valve member effectively in a straight line into engagement with the valve seat. Thus, the effective straight line motion provided by one or more bushings with eccentrically disposed bores of the type taught by Muench in U.S. Pat. No. 3,262,671, or the axial motion provided by a modified Scotch yoke or other known mechanisms, may be used to move the spherical valve member axially into engagement with the valve seat during assembly. Further, the spherical valve member is free floating, to the extent that it is not journaled at the bottom of the valve chamber, but is supported only by the valve stem. Thus, it is free to move vertically or in the axial path of the valve stem during assembly and, therefore, is free to seat properly in the vertical direction. The improvement disclosed here is that after the spherical valve member has moved in an effective straight line in a horizontal plane, and axially in a vertical plane, to engage the valve seat, the bonnet is permanently secured within the bonnet opening as by welding and there is no further adjustment.

The invention will be better understood by reference to the attached drawings in which:

BRIEF DESCRIPTION OF THE DRAWINGS

FIGS. 2 through 4 are diagramatic views of the assembled valve of this invention in closed, partially-open, and full open positions.

FIGS. 5 through 7 are diagramatic sectional views, taken along section lines 5 through 7 of FIGS. 2 through 4, illustrating the centerline of the spherical valve member and the centerline of the stem in the positions illustrated in FIGS. 2 through 4.

DETAILED DESCRIPTION OF THE PREFERRED EMBODIMENT

Figure 1:
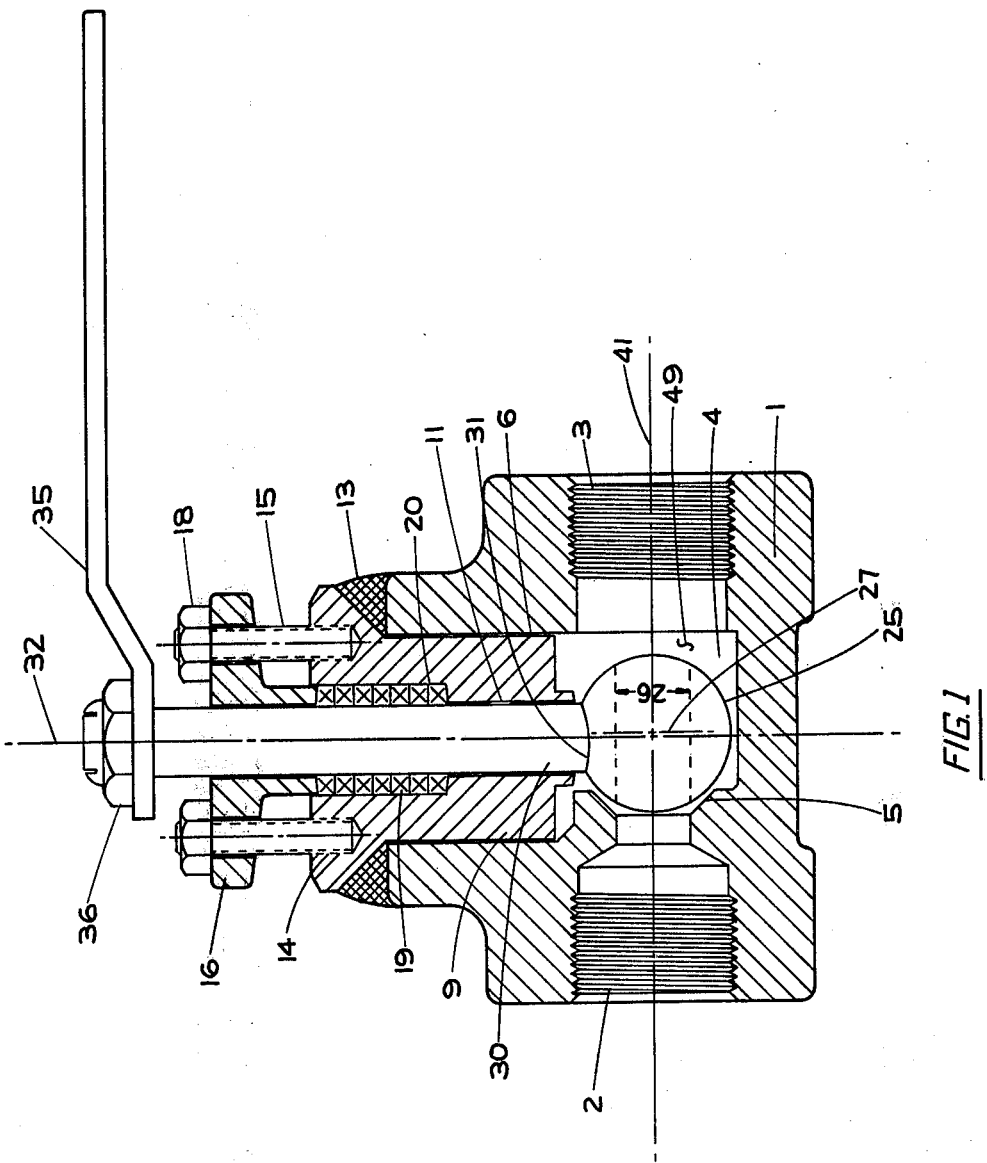
FIG. 1 is a sectional view with parts in elevation of the valve of this invention in open position.

Referring now to the drawings, and specifically to FIG. 1, the valve casing 1 contains a threaded inlet 3 and a threaded outlet 2. The valve chamber 4, having interior wall 49, is arranged so that there is an annular valve seat 5 at the outlet 2. At the top of the valve chamber is a bonnet opening 6 in which the bonnet 9 is fitted and welded into position as at 13.

The shoulder of the bonnet is tapped at 14 for provision of studs 15 which extend through the packing gland 16. The nut 18 holds the packing gland 16 into position so as to exert pressure onto the packing 19, in packing chamber 20, surrounding the valve stem 30 journaled in the bore 11 of the bonnet. The spherical valve member 25 is shown here with the cylindrical fluid passage 26, in parallel alignment with the aligned inlet 3 and outlet 2, the passages of which the latter have a common axis 41. The spherical valve member 25 is attached to the valve stem 30 at 31. The valve stem, as previously mentioned, is rotatably journaled within the bore 11 of the bonnet and extends outwardly and is equipped with a handle 35, held in place by lock nut 36. As previously mentioned, the packing gland 16 is fitted over the valve stem 30 and is adjustable by means of nuts 18 on the threaded studs 15.

Refer now to FIGS. 2 through 7. The spherical valve member 25 in closed position and in engagement with the valve seat 5 of the outlet 2, is shown in FIG. 2. The centerline 32 of the valve stem 30 is illustrated in FIG. 5, relative to the centerline 27 of the spherical valve member 25, showing that the offset of the spherical valve member 25 is in a direction so as to be in axial alignment with the axis of the cylindrical fluid passage 26. Thus, a line 40, projected across the centerlines 27 and 32, in this position, is parallel with the long axis of the cylindrical fluid passage 26 and is perpendicular to the flow axis which has the same centerline as the inlet and outlet passages and is illustrated in dotted lines by line 41 extending through the outlet 2 of the valve casing. As the handle 35 of the valve is turned in counterclockwise direction, as is illustrated in FIG. 3, the spherical valve member 25, moves away from the valve seat 5. The mechanical advantage afforded by this arc-like motion and by the handle 35 is such that the spherical member moves quite easily out of the closed position to the open position. Again, FIG. 6 illustrates the relationship of the centerline 27 of the spherical valve member 25 to the centerline 32 of the valve stem 30, with line 40 projected there through.

FIG. 4 shows the spherical valve member 25 in open position with the cylindrical flow passage 26 in parallel alignment with the flow axis 41 of the valve and with the spherical valve member 25 moved some distance away from the valve seat 5. Again, referring to FIG. 7, the centerline 32 of the stem and the centerline 27 of the spherical valve member 25 are in alignment and parallel to the flow axis 41 of the valve.

As mentioned previously, this arrangement is optimum for effective self-locking closure of the spherical valve member against the valve seat for ease of operation and for the maximum wear life of the seat 5 and the spherical valve member 25. Since the spherical valve member 25 moves in an arc from the open position shown in FIG. 4 to the closed position shown in FIG. 2, the spherical valve member actually wipes the surface of the valve seat 5 in tangential engagement, thus preventing the lodgement of foreign matter between the spherical valve member 25 and the valve seat 5. Further, sufficient pressure can be exerted on the valve seat so that the continual opening and reclosing of the valve produces a burnishing and lapping effect on the seating surfaces, thus prolonging the life of the valve seat and the valve. Additionally, in the open position as shown in FIG. 4 and FIG. 7, since the sphere has moved in an arc, the exterior surface of the spherical valve member 25 is in engagement with the interior wall 49 of the valve chamber 4 so that an external backstop is not required to prevent the rotation of the valve beyond a certain point. Under the rigorous conditions of oil fields and petrochemical plants, such external backstops may be bent, damaged and deformed or even broken off completely. Since the backstop in this case is internal, no such damage can befall it.

Figure 8:
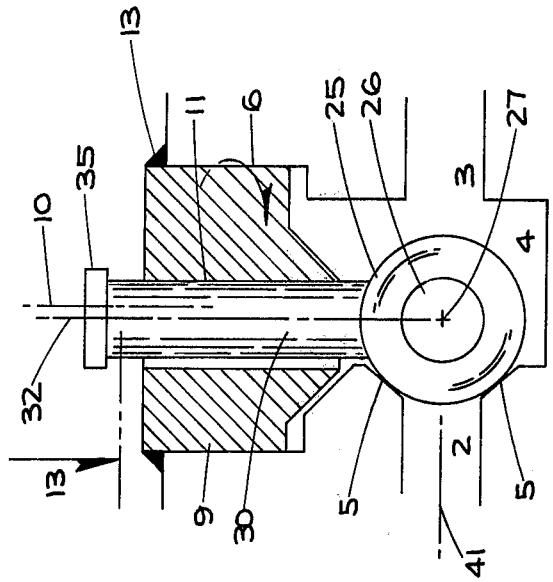
FIGS. 8 through 10 diagramatically illustrate the method of assembly of the valves.
Figure 11:
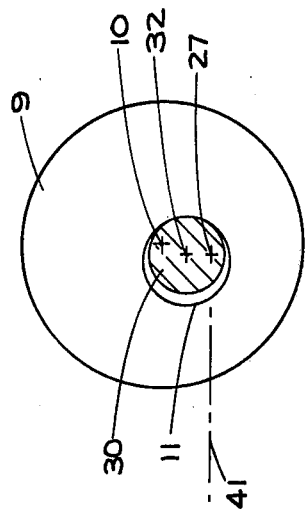
FIGS. 11 through 13 are sectional views taken along section lines 11 through 13 of FIGS. 8 through 10, indicating the location of the centerline of the bonnet, of the valve stem, of the spherical valve member and of the flow axis through the inlet and outlet passages in the valve casing.
Figure 9:
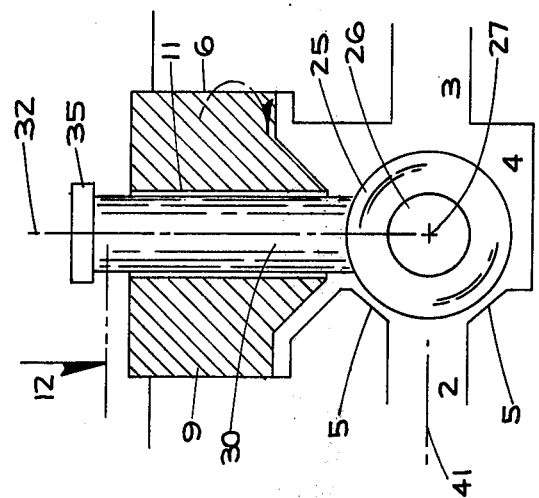
Figure 12:
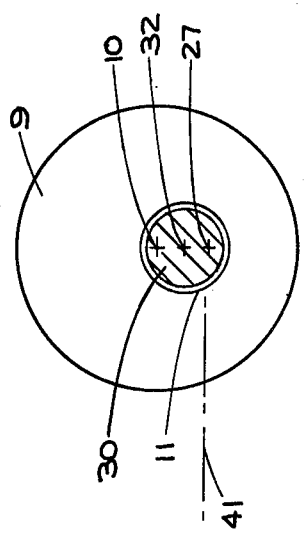
Figure 10:
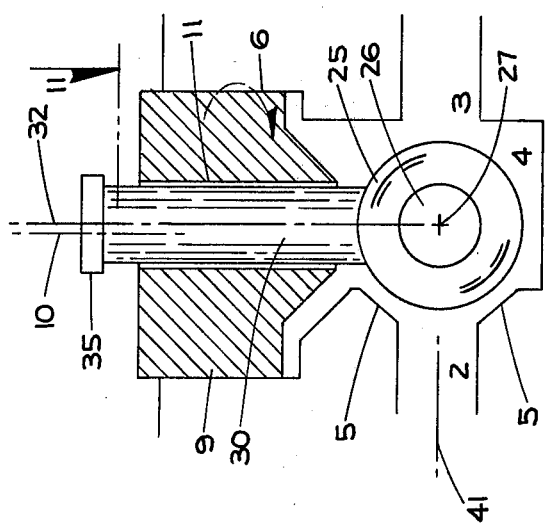
Figure 13:
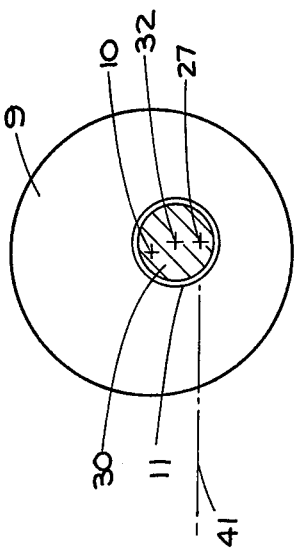

Referring now to FIGS. 8 through 10, and corresponding FIGS. 11 through 13, the method of assembly of the valve is diagramatically illustrated. In FIG. 8, valve stem 30 with the spherical valve member 25 eccentrically attached thereto, has been inserted into the bonnet opening 6 so that the spherical valve member 25 is located within the valve chamber 4. As is shown, in the drawing, the cylindrical fluid passage 26 is transversely disposed relative to the centerline 41 of the passages of outlet 2 and inlet 3. The bonnet 9 has been placed with the bore 11 surrounding the valve stem 30. It will be noted here that in this position, the spherical valve member 25 is not in seating engagement with the valve seat 5. Therefore, the bonnet 9 is turned in a clockwise direction, thus moving the entire stem 30 and spherical valve member 25 effectively in a straight line toward the seat 5. It will be noted here in referring to FIG. 11, that in the "extreme out" position, shown in FIG. 8, in which the spherical valve member 25 is out of engagement with this seat 5, the centerline 10 of the bonnet 9 was located to the left of the aligned centerline of the stem 32 and the centerline 27 of the spherical valve member 25. However, as the bonnet 9 is rotated, as shown in FIGS. 9 and 12, the centerline 32 of stem 30 and the centerline 27 of spherical valve member 25, come into alignment with the centerline 10 of the bonnet 9. As shown now in FIGS. 10 and 13, as the bonnet 9 is rotated further, the external surface of the spherical valve member 25 comes into seating engagement with the seat 5. In this case, as is illustrated in FIG. 13, the aligned centerline 32 of stem 30 and the centerline 27 of spherical valve member 25 are now disposed to the left of centerline 10 of bonnet 9.

Since the spherical valve member 25 is vertically free floating, i.e., not axially restrained at the bottom nor the top, it is allowed to move vertically or in the direction of the valve stem axis 32, into proper seating engagement with the seat 5 as the bonnet 9 is rotated.

It is necessary to provide clearance between the wall of the bore 11 and the stem 30 so that the valve stem 30 and the spherical valve member 25 can move from the "extreme out" position shown in FIG. 8 to the engaged position shown in FIG. 10. The movement illustrated in FIGS. 8 through 10 is considered to be effectively a straight line. Actually, the valve stem 30 and the spherical valve member 25 move in an indeterminate path within the confines allowed by the clearance of the bore 11 and the stem 30 but in a direction generally toward the seat 5. The spherical valve member 25 also moves in an indeterminate path within the valve chamber 4 but again, generally, toward the seat 5 until the spherical valve member 25 engages the seat 5. Thereafter, the bearing pressure of the bore 11 against the stem 30 moves the spherical valve member 25 into engagement with the seat 5 in both the horizontal and vertical planes. Without the clearance between the valve stem 30 and the bore 11, this movement would not be possible. This movement is referred to herein after as effective straight line motion, since the result is movement from one point to another. The provision of the clearance allows for standard manufacturing tolerances. It should be understood that the relationships shown in FIGS. 8 through 13 have been exaggerated for purposes of illustration.

As this point, the bonnet is welded or otherwise permanently secured into place and it is never again necessary to readjust the position relationship of the bore 11 in the bonnet 9 to that of the seat 5.

Packing 19 is then inserted into the packing chamber 20 and the packing gland 16 is then bolted into place.

Since the sphere moves in an arc from the open position shown in FIG. 4, to the closed position shown in FIG. 2, as the seat and the sphere wear, the sphere is rotated further, thus prolonging the valve life. Further, with continual reclosing of the valve, pressure of the spherical valve member 25 against the seat 5, due to the eccentricity of the various members and due to the length of the handle, causes a certain amount of burnishing and lapping of the seating surfaces. This prolongs the useful life of the seat 5 and spherical valve member 25. Further, the angle of approach 50 (see FIG. 5) of the spherical member 25 to the seat 5 is such that it is self-locking even under the rigorous vibrations sometimes encountered in petrochemical and oil field lines. It is necessary that the angle of approach be greater than 0° in order to be self-locking. A preferred range is less than 5°.

While the described embodiment is believed to be the most efficient and most economical method so far developed for the assembly of said valves, it is within the scope of this invention, however, to utilize known means of moving the spherical valve member in an effective straight line into seating engagement with the valve seat. Thus, effective straight line motion, provided by one or more bushings with eccentrically disposed bores of the type taught by Muench in U.S. Pat. No. 3,262,671 or the axial motion, provided by a modified Scotch yoke or of other known mechanisms, may be used to move the spherical valve member in an effective straight line into engagement with the valve seat during assembly. Further, the spherical valve member is free floating to the extent that it is not restrained axially at the bottom or top of the valve chamber but is supported only by the valve stem and therefore is free to move vertically or in the axial path of the valve stem and, therefore, is free to seat properly in the vertical direction.

According to this invention, ball type valves can be produced in mass production within normal manufacturing tolerances as precision closure instruments for a long and useful life under extremely rigorous conditions.

Many modifications will occur to those skilled in the art from the detailed description herein above given and such is meant to be exemplary in nature and nonlimiting except so as to be commensurate in scope with the appended claims.

I claim:

1. A valve comprising:
   A. a casing, having aligned inlet and outlet passages, a bonnet opening, at right angles to the axis of said inlet and outlet passages, a valve chamber for provision of a valve member to effect closure, an annular valve seat surrounding one of said passages;
   B. a bonnet for said casing, said bonnet having a bore axially aligned parallel to the centerline of said bonnet opening;
   C. a valve stem rotatably journaled in the bore of said bonnet and extending into said casing at one end and projecting out of said casing at the other;
   D. packing surrounding said valve stem;
   E. a spherical valve member, having a cylindrical fluid passage therethrough and mounted on said valve stem for movement between an open position in which said cylindrical fluid passage is in parallel axial alignment with said axis of said inlet and outlet passages and a closed position in which said cylindrical fluid passage is disposed transversely across said valve chamber, normal to said axis of said aligned inlet and outlet passages, and
   F. means to rotate said valve stem;
   G. said spherical valve member being mounted so that its centerline is offset relative to the centerline of said stem;
   H. the improvement wherein:
      1. the centerline of said bonnet opening is offset from the axis of said inlet and outlet passages, and
      2. said stem is mounted so that its centerline is offset from the centerline of said bonnet, and
      3. the spherical valve member moves in an arc between open and closed positions, so as to engage the valve seat tangentially with a wiping action and defines an angle of approach to said valve seat of greater than 0° so as to be self-locking;
I. the further combination therewith of:
   1. movement means including the co-action of the bore of said bonnet and the stem of said valve member responsive to the rotation of said bonnet for moving said spherical valve member in an effective straight line into seating and engagement with said seat during assembly; and
   2. means for permanently securing said bonnet in fixed position.

2. A valve, as defined in claim 1, in which:
   A. the bore of said bonnet, has a centerline which is offset from the centerline of said bonnet and from the centerline of said spherical valve member; and
   B. said bore has a larger internal diameter than the external diameter of said stem to allow for effective straight-line movement of said stem during assembly of said valve.

3. A valve, as defined in claim 1, the further improvement wherein said spherical valve member is free floating in the direction of the centerline of said valve stem and is attached only to said stem.

4. A valve, as defined in claim 1, the further improvement wherein the spherical valve member in full open position engages the inside wall of the valve cavity and acts as a backstop for said spherical valve member to prevent further rotation thereof.

5. A valve, as defined in claim 1, the further improvement in which said means for turning said valve stem is a handle disposed in parallel alignment with the axis of said cylindrical fluid passage of said spherical valve member.

6. A method of assembling a valve from an assemblage of complementary parts which includes:
   A. a casing, having aligned inlet and outlet passages, a valve chamber opening at the top, the centerline of said opening being offset from the axis of said aligned inlet and outlet passages and an annular valve seat surrounding one of said passages;
   B. a bonnet for said opening, said bonnet having a bore extending through said bonnet with its centerline offset relative to the axis of said aligned inlet and outlet passages;
   C. a valve stem,
   D. a spherical valve member, having a cylindrical fluid passages therethrough,
   E. movement means including the co-action of said valve stem and the bore of said bonnet, responsive to the rotation of said bonnet,
   F. the stems which comprise:
      1. attaching said spherical valve member to said valve stem so that the centerline of the spherical valve member is offset relative to the centerline of said valve stem;
      2. inserting said spherical valve member through said opening at the top of said valve casing into said valve chamber and aligning said spherical valve member so that said cylindrical fluid passage lies perpendicular to the axis of said aligned inlet and outlet passages;
      3. placing said bonnet into position in the opening at the top of said valve chamber with said valve stem protruding through the bore of said bonnet;
      4. holding said valve stem and said spherical valve member in position and rotating said bonnet until the spherical valve member engages said seat in sealing engagement,
      5. permanently securing said bonnet into position in said valve casing and
      6. inserting packing around said valve stem and securing said packing into place.

* * * * *